United States Patent [19]

Phillips et al.

[11] Patent Number: 5,190,735
[45] Date of Patent: Mar. 2, 1993

[54] RECOVERY OF GERMANIUM-68 FROM IRRADIATED TARGETS

[75] Inventors: Dennis R. Phillips; David J. Jamriska, Sr.; Virginia T. Hamilton, all of Los Alamos, N. Mex.

[73] Assignee: The United States of America as represented by the United States Department of Energy, Washington, D.C.

[21] Appl. No.: 860,617

[22] Filed: Mar. 30, 1992

[51] Int. Cl.$^5$ .................................... C01G 17/00
[52] U.S. Cl. ................................... 423/2; 423/249; 423/21.5; 423/22; 423/49; 423/54; 423/63; 423/70; 423/87; 423/89; 423/100; 423/112; 423/139; 423/157; 210/759
[58] Field of Search ............... 423/2, 249, 89, 87, 423/53; 210/759

[56] References Cited

U.S. PATENT DOCUMENTS

| | | | |
|---|---|---|---|
| 2,811,418 | 10/1957 | Theuerer | 423/89 |
| 3,102,786 | 9/1963 | Ernst et al. | 423/89 |
| 4,248,730 | 2/1981 | Mirzadeh et al. | 252/332 |
| 4,276,267 | 6/1981 | Bentley et al. | 423/2 |
| 4,568,526 | 2/1986 | Rouillard nee Bauer et al. | 423/87 |
| 4,765,834 | 8/1988 | Ananthapadmanabhan et al. | 75/108 |
| 4,915,919 | 4/1990 | Boateng et al. | 423/89 |

OTHER PUBLICATIONS

Radiochemica Acta, 28, 47–49 (1981), Mirzadeh et al.

"Studies of the Chemical Behavior of Carrier-Free $^{68}$Ge".

Primary Examiner—Donald P. Walsh
Assistant Examiner—Ngoclan T. Mai
Attorney, Agent, or Firm—Bruce H. Cottrell; Paul D. Gaetjens; William R. Moser

[57] ABSTRACT

A process for selective separation of germanium-68 from proton irradiated molybdenum targets is provided and includes dissolving the molybdenum target in a hydrogen peroxide solution to form a first ion-containing solution, contacting the first ion-containing solution with a cationic resin whereby ions selected from the group consisting of molybdenum, niobium, technetium, selenium, vanadium, arsenic, germanium, zirconium and rubidium remain in a second ion-containing solution while ions selected from the group consisting of rubidium, zinc, beryllium, cobalt, iron, manganese, chromium, strontium, yttrium and zirconium are selectively adsorbed by the first resin, adjusting the pH of the second ion-containing solution to within a range of from about 0.7 to about 3.0, adjusting the soluble metal halide concentration in the second ion-containing solution to a level adapted for subsequent separation of germanium, contacting the pH-adjusted, soluble metal halide-containing second ion-containing solution with a dextran-based material whereby germanium ions are separated by the dextran-based material, and recovering the germanium from the dextran-based material, preferably by distillation.

14 Claims, No Drawings

RECOVERY OF GERMANIUM-68 FROM IRRADIATED TARGETS

FIELD OF THE INVENTION

The present invention relates to the field of selective separation of various radioisotopes. More particularly, the present invention relates to the selective separation of germanium isotopes, i.e., germanium-68, niobium isotopes, i.e., niobium-91m and niobium-95, and arsenic isotopes, i.e., arsenic-73 and arsenic-74. This invention is the result of a contract with the Department of Energy (Contract No. W-7405-ENG-36).

BACKGROUND OF THE INVENTION

Positron emission tomography (PET) is rapidly becoming essential in diagnosis of heart and neurological conditions and is also useful in the staging and assessment of cancer treatments. PET is also a valuable research tool for studying in vivo biochemical functions during either normal or disease states. A drawback to PET is the necessity of a large capital investment. Still, the growth of PET as a procedure and the acquisition of PET scanners by medical centers is expected to grow rapidly over the next few years and the development of mobile PET units may be near.

Every PET scanner or instrument must be calibrated using radioisotope sources containing a positron emitter. Additionally, virtually every clinical scan must be accompanied by a patient "transmission scan" to permit proper image interpretation. All of the commercial calibration and transmission sources for current clinical PET scanners use germanium-68.

Germanium-68 has a half-life of about 271 days, decays by electron capture to gallium-68, and lacks any significant photon emissions. Gallium-68 decays by positron emission. These properties make germanium-68 an ideal isotope for calibration and transmission sources. Additionally, gallium-labelled imaging agents such as disclosed in U.S. Pat. No. 5,079,346 can employ gallium-68 produced from a germanium-68/gallium-68 generator. Thus, the availability of the long-lived parent, germanium-68, is of significant interest because of its generation of the shorter-lived gallium metal activity. The useful shelf-life is determined by the activity of the germanium-68, while the short half-life of the gallium-68, about 68 minutes, minimizes the radiation dose to technicians during calibration of PET scanners and the patient transmission scans.

Previously, germanium-68 has been recovered from an irradiated rubidium target. In such a recovery process, the rubidium target is generally dissolved in 4 Normal (N) to 9 N HCl, followed by distillation of the germanium and other volatiles such as arsenic and selenium. The germanium is then selectively recovered from the distillate by extraction with carbon tetrachloride. A second extraction of the carbon tetrachloride solution with water yields an aqueous solution of the germanium. While this process proves suitable for recovery of the germanium from the rubidium targets, other sources of germanium are not as easily processed by this procedure.

Irradiated molybdenum targets have generally served as a source for the separation of strontium, yttrium, zirconium and rubidium isotopes. Such irradiated molybdenum targets have now been found to contain a significant amount of germanium-68 that has previously gone unrecovered. Such irradiated targets also contain quantities of niobium and arsenic that may also be sought to be recovered. Recovery of these isotopes would provide additional supplies for the medical community. Optionally, recovery of germanium via an organic solvent-free process may be desirable to minimize waste.

Accordingly, it is an object of this invention to provide a process for the recovery of germanium-68 from irradiated molybdenum targets.

Another object of this invention is to provide a process for selectively separating both the niobium and the germanium from irradiated molybdenum targets.

Yet another object of this invention is to provide a process for selectively separating both the germanium and the arsenic from irradiated molybdenum targets.

Still another object of this invention is to provide a process for selectively separating the niobium, arsenic and germanium from irradiated molybdenum targets.

It is a further object of this invention to provide an organic solvent-free process for recovery of germanium-68.

SUMMARY OF THE INVENTION

To achieve the foregoing and other objects, and in accordance with the purposes of the present invention, as embodied and broadly described herein, the present invention provides a process for selective separation of germanium-68 from proton irradiated molybdenum targets including dissolving the proton irradiated molybdenum target in a hydrogen peroxide solution to form a first ion-containing solution, contacting the first ion-containing solution with a cationic exchange resin whereby ions selected from the group consisting of molybdenum, technetium, zirconium, rubidium, selenium, vanadium, niobium, arsenic and germanium are separated into a second ion-containing solution while ions selected from the group consisting of rubidium, zinc, beryllium, cobalt, iron, manganese, chromium, strontium, yttrium and zirconium are selectively adsorbed by the cationic exchange resin, adjusting the pH of the second ion-containing solution to within a range of from about 0.7 to about 3.0, adjusting the soluble metal halide concentration in the second ion-containing solution to a level adapted for subsequent separation of germanium, contacting the pH-adjusted second ion-containing solution with a dextran-based material for time sufficient whereby germanium ions are separated by the dextran-based material, and recovering the germanium from the dextran-based material. In a preferred embodiment, the germanium is separated by distillation from the dextran-based material. In another embodiment of the invention, a process is provided for selective separation of arsenic from proton irradiated molybdenum targets including dissolving the proton irradiated molybdenum target in a hydrogen peroxide solution to form a first ion-containing solution, contacting the first ion-containing solution with a cationic exchange resin whereby ions selected from the group consisting of molybdenum, technetium, zirconium, rubidium, selenium, vanadium, niobium, arsenic and germanium are separated into a second ion-containing solution while ions selected from the group consisting of rubidium, zinc, beryllium, cobalt, iron, manganese, chromium, strontium, yttrium and zirconium are selectively adsorbed by the cationic exchange resin, adjusting the pH of the second ion-containing solution to within a range of from about 0.7 to about 1.5, adjusting the soluble metal halide concentration in the second ion-containing solution to a level adapted for subsequent separation of arsenic, contacting the pH-adjusted second ion-containing solution with a dextran-based material for time sufficient whereby germanium and arsenic ions are separated by the dextran-based material, recovering the germanium and arsenic from the dextran-based material, and selectively separating the arsenic from the germanium.

DETAILED DESCRIPTION

The present invention concerns the selective separation of radioisotopes, specifically germanium-68, and optionally niobium-91m, niobium-95, arsenic-73 and arsenic-74, from a previously irradiated target, i.e., a proton irradiated molybdenum target. Such a process can produce previously unrecovered quantities of germanium-68 for use in the fields of nuclear chemistry and/or nuclear medicine.

As a starting material in the present process, a molybdenum target is irradiated by energetic protons having energies sufficient to generate a large number of isotopes by spallation reactions, generally energies greater than about 200 MeV, more preferably from about 600 MeV to about 800 MeV. In order to produce the desired Curie quantities of the radioisotopes, the molybdenum target should have a mass of at least about 100 grams (g).

One method of irradiation is by proton bombardment of the molybdenum target. Such proton bombardment can be accomplished by inserting the target into a linear accelerator beam at a suitable location whereby the target is irradiated at an integrated beam intensity of from about 30 milliampere-hours (mA-hr) to about 1000 mA-hr. The molybdenum target can consist of a number of metal foils sandwiched together or can be a single metal piece generally up to about 0.8 inches in thickness. After the irradiation of the molybdenum target, the target is generally allowed to sit for a period of time whereby unwanted short-lived isotopes will decay.

In the selective separation of the present invention, the irradiated target is initially dissolved into a hydrogen peroxide solution by either a batch or continuous process. Preferably, this dissolution is by a batch process as this greatly reduces the time necessary for the dissolution. The hydrogen peroxide solution can be of any convenient concentration, although concentrated solutions, i.e., solution concentrations greater than about 20 percent by weight hydrogen peroxide, are preferred for quicker dissolution. A hydrogen peroxide solution of about 30 percent by weight hydrogen peroxide is especially preferred for the dissolution. After the target is dissolved, additional hydrogen peroxide is generally added until the solution is a pale yellow color indicating that the oxidation state of the molybdenum is within a preferred range, i.e., within the range of neutral and anionic molybdenum species whereby such species will pass through a cationic exchange column.

The resultant solution is then contacted with a cation exchange resin, preferably by passing the solution through a bed of the cation exchange resin. The cation exchange resin is preferably a strong acid resin and can be, for example, a strong acid resin such as AG 50 W-X8, available from Bio-Rad Laboratories. Generally, the cations including zinc, beryllium, cobalt, iron, manganese, chromium, strontium, yttrium, a portion of the rubidium, and a portion of the zirconium will be adsorbed or remain on the cation exchange resin while other ions including molybdenum, technetium, selenium, vanadium, a portion of the zirconium, a portion of the rubidium, niobium, arsenic, and germanium remain in the solution and can be selectively separated from the cation exchange resin. Residual solution can be removed from the resin by washing or rinsing with a hydrogen peroxide solution or water. The mesh size of the cation exchange resin can be from about 50 mesh to about 400 mesh, more preferably from about 100 mesh to about 200 mesh.

Generally, the pH of the second ion-containing solution is then adjusted to within a range of from about 0.7 to about 3.0 by addition of, e.g., sodium hydroxide or hydrochloric acid. In some cases, no pH adjustment will be necessary. Preferably, for the selective separation of germanium the pH of the second ion-containing solution is adjusted to within a range of from about 1.5 to about 2.0. At pH's less than about 2.0 and especially at pH's less than about 1.5, arsenic will be separated in addition to the germanium. Such arsenic can be separated from the germanium. At pH's less than about 0.7, the solution can adversely affect the dextran-based material. For the selective separation of germanium and arsenic, the pH of the second ion-containing solution is generally adjusted to within a range of from about 1.0 to about 2.0.

In addition to the pH adjustment, a soluble metal halide, e.g., an alkali metal halide such as an alkali metal chloride, an alkali metal fluoride, an alkali metal iodide or an alkali metal bromide, e.g., sodium chloride, sodium iodide, sodium bromide, sodium fluoride, potassium fluoride, potassium bromide, potassium iodide or potassium chloride, an alkaline earth metal halide such as an alkaline earth metal chloride, an alkaline earth metal fluoride, an alkaline earth metal iodide or an alkaline earth metal bromide, e.g., calcium chloride, calcium iodide, calcium bromide, calcium fluoride, magnesium fluoride, magnesium bromide, magnesium iodide or magnesium chloride, is added to the solution for enhanced recovery of germanium and optionally arsenic. Preferably, the soluble metal halide is sodium chloride, calcium chloride, potassium chloride or ferric chloride, more preferably sodium chloride. Preferably, the soluble metal halide is added to the solution in amounts sufficient to yield solutions containing greater than about 25 grams per liter of the soluble metal halide. The soluble metal halide can be added to the solution either before or after the adjustment of the pH, but at a time prior to the subsequent contact of the solution with a dextran-based material.

After adjusting the pH, the pH-adjusted, soluble metal halide-containing second ion-containing solution is contacted with a dextran-based material whereby germanium ions are separated by the dextran-based material. Other ions selected from the group consisting of molybdenum, technetium, selenium, vanadium, zirconium, rubidium and a portion of the niobium remain in solution and can then be separated from the germanium. Depending upon the pH of the pH-adjusted second ion-containing solution, arsenic may accompany the germanium and can be subsequently separated from the germanium. Generally, the dextran-based material may have cationic groups, anionic groups or may be free of ionic groups. Exemplary of such dextran-based materials is Sephadex chromatographic powder, a trademarked chromatographic powder of Pharmacia Fine Chemicals, Inc., available from Pharmacia Fine Chemicals, Inc. or from Sigma Chemical Co.

The germanium is then separated from the dextran-based material. In a preferred embodiment of the invention, the germanium is separated from the dextran-based material by distillation. Such a distillation can be conducted by placing the dextran-based material and the adsorbed germanium into a distillation flask and distilling at temperatures from about 20° C. to about 100° C. at ambient pressure. Other ions such as niobium or zirconium that have been adsorbed by the dextran-based material will remain in the flask as the germanium and some arsenic are distilled.

The germanium can also be recovered by contacting the germanium containing dextran-based material with a solution of hydrochloric acid and hydrofluoric acid to form another ion-containing solution. Calcium chloride is then added to the fourth ion-containing solution to precipitate calcium fluoride, niobium and zirconium. Finally, the liquid is filtered from any precipitate and the germanium is separated by distillation.

Still another method of recovering the germanium from the dextran-based material is by addition of concentrated HCl to the dextran-based material after absorption of the germanium. The concentrated HCl can essentially dissolve the dextran-based material leaving a germanium-containing solution. Further purification of the germanium by distillation may generally be desired.

Yet another method of recovering the germanium from the dextran-based material is by washing the dextran-based material with water, weak bases such as dilute sodium hydroxide or acid solutions, e.g., a solution including a major portion of HCl and a minor portion of HF. Depending upon the pH of the solution from which the germanium was removed by the dextran-based material, such washing can separate either minor or major portions of the germanium.

The germanium can be selectively separated from the arsenic by contacting the germanium/arsenic solution, the solution being an acidic aqueous solution having about a 6N HCl concentration with successive portions of a non-polar organic solvent, preferably carbon tetrachloride, whereby the germanium is stripped into the organic phase while the arsenic remains in the acidic solution. Generally, the total volume of the organic phase will be less than half the total volume of the acidic aqueous phase. The germanium can be further concentrated by successive mixing of the germanium-containing carbon tetrachloride solution with about successive portions of water, such portions generally total less than about a quarter of the volume of the organic phase, whereby the germanium is back-extracted into the water.

The solution recovered after contacting the dissolved target solution with the cationic exchange resin contains niobium and arsenic in addition to the germanium. While the above described process serves to selectively separate the germanium from the rest of the ions in solution, this process leaves the niobium ions unseparated. In another embodiment, when it is desired to also separate and recover the niobium, the above process can be modified by use of a second quantity of dextran-based material and separately recover the niobium in addition to the selective separation of the germanium and optionally the arsenic.

In separating the niobium, the irradiated molybdenum target is dissolved as before and the resultant solution contacted with the cationic exchange resin to yield the initial separation described above. The second ion-containing solution is then adjusted to a pH range within from about 5.0 to about 6.0 and the pH adjusted second ion-containing solution contacted with a first dextran-based material whereby at least a portion of the niobium ions are selectively separated by the dextran-based material and the remaining ions selected from the group consisting of molybdenum, technetium, selenium, vanadium, zirconium, rubidium, arsenic, and germanium remain in a third ion-containing solution. This third ion-containing solution can then be processed as before to recover the germanium, i.e., the pH of the solution can be adjusted to within the range of about 0.7 to about 3.0, the pH adjusted solution contacted with a dextran-based material, and the germanium recovered from the dextran-based material by, e.g., distillation. The niobium can be recovered from the first dextran-based material by washing with an HCl solution and a trace of HF, e.g., a 6 molar HCl/0.1 molar HF solution.

The present invention is more particularly described in the following examples which are intended as illustrative only, since numerous modifications and variations will be apparent to those skilled in the art.

EXAMPLE 1

An 80 gram (g) molybdenum target of greater than 99.9 percent purity, was irradiated with 600–800 MeV protons at an integrated beam intensity of from about 100 to 200 mA-hr. This yielded induced gamma activities measured 10 days after the end of the bombardment. Of the various activities produced, activity was measured from strontium-82, strontium-85, beryllium-7, vanadium-48, manganese-54, cobalt-58, iron-59, zinc-65, arsenic-73, arsenic-74, selenium-75, rubidium-83, rubidium-84, yttrium-88, zirconium-88, zirconium-95, niobium-91m, niobium-95, and technetium-95m isotopes. The irradiated molybdenum target was dissolved batchwise (400 milliliters (ml) per batch) in a total of 2.5 liters (l) of an unstabilized 30% by weight hydrogen peroxide solution.

Excess hydrogen peroxide was added until the color of the solution changed from orange to a pale yellow. The resulting solution was then passed through 50 ml of cation exchange resin (a strong acid resin available from Bio-Rad Laboratories as AG 50 W-X8). The cations including rubidium-83, zinc-65, beryllium-7, cobalt-58, iron-59, manganese-54, chromium-51, strontium-82, strontium-85, yttrium-88, and zirconium-88 were adsorbed by the resin while the remaining radioisotopes including the germanium-68, the niobium-91m/95 and the arsenic-73/74 remained in the solution.

As the pH of this solution was measured as about 1.5, no adjustment of the pH was necessary. Sodium chloride was added to the solution to yield a solution containing 25 grams per liter of NaCl. As the solution at this point still contained substantial levels of hydrogen peroxide, the solution was boiled for about 30 to 45 minutes to decompose the remaining peroxide. A precipitate was observed and the solution was separated by filtering from the solid material. The resulting solution was passed through a column containing from about 20 to 30 milliliters wet dextran-based material (Sephadex). The dextran-based material including the separated germanium was dumped directly into a flask. Sufficient 6N HCl was added to the flask to yield a total volume of from about 500 milliliters and the contents of the flask were distilled. The resultant distillate was found to contain germanium-68.

Using the described separation steps, the germanium-68 radioisotope was obtained in pure form with no detectable radioactivity from other radioisotopes.

EXAMPLE 2

A portion, 5 milliliters (ml), of the eluate solution taken after the first cationic exchange resin stage in the strontium separation process described in a co-pending, co-assigned application entitled "Process for Strontium-82 Separation" by Heaton et al., U.S. Ser. No. 744,747, filed Aug. 14, 1991 was adjusted in pH to about 5.8. Sodium chloride was added in an amount sufficient to yield a solution containing 25 g/l of NaCl. The solution was then passed through a column containing about 2 milliliters wet dextran-based material (Sephadex). The dextran-based resin including the separated niobium was thus separated from a solution containing, e.g., the germanium and arsenic as well as the other initial ions. The niobium was recovered from the column by washing with a solution of 6N HCl and 0.5N HF.

The germanium was then recovered as in example 1 by initially adjustinq the pH to about 3.0, contacting the solution with a second 2 ml wet portion of the dextran-based material, and recovering the germanium by washing with a solution of 6N HCl and 0.5N HF.

EXAMPLE 3

Eluate solution, 4.5 liters, taken after the first cationic exchange resin stage as described in example 2 was adjusted in pH to about 1.0. The solution was then passed through a first column containing about 10 milliliters wet dextran-based material (Sephadex) and a second column containing about 10 milliliters wet dextran-based material Sephadex). Next, the solution was passed through a third column containing about 30 milliliters wet dextran-based material (Sephadex). The pH of the solution was adjusted to about 2.0 and the solution was passed through another column containing about 10 milliliters wet dextran-based material (Sephadex). The first three columns were washed with a solution of 0.2 Molar sodium hydroxide and the last column was washed with water. The contents of the columns and various washes were combined into a flask, the resultant slurry acidified to a 6N HCl concentration and the solution distilled to separate the germanium and the arsenic. The distillate of about 230 ml contained about 60 millicuries of geranium.

Although the present invention has been described with reference to specific details, it is not intended that such details should be regarded as limitations upon the scope of the invention, except as and to the extent that they are included in the accompanying claims.

What is claimed is:

1. A process for selective separation of germanium-68 from proton irradiated molybdenum targets comprising:
    dissolving a proton irradiated molybdenum target in a hydrogen peroxide solution to form a first ion-containing solution;
    contacting the first ion-containing solution with a cationic exchange resin whereby ions selected from the group consisting of molybdenum, technetium, selenium, vanadium, a portion of zirconium, a portion of rubidium, niobium, arsenic and germanium are contained within a second ion-containing solution while ions selected from the group consisting of a portion of rubidium, zinc, beryllium, cobalt, iron, manganese, chromium, strontium, yttrium and a portion of zirconium are selectively adsorbed by the cationic exchange resin;
    adjusting the pH of the second ion-containing solution to within the range of from about 0.7 to about 3.0;
    adding sufficient soluble metal halide to the second ion-containing solution to adjust concentration of the soluble metal halide in the second ion-containing solution to a level adapted for subsequent separation of germanium;
    contacting the pH-adjusted, soluble metal halide-containing second ion-containing solution with a dextran-based material for sufficient time whereby germanium, niobium, zirconium and arsenic are separated by the dextran-based material; and,
    recovering the germanium from the dextran-based material.

2. The process of claim 1 wherein the adjustment of pH is from about 1.5 to about 2.0.

3. The process of claim 1 wherein the soluble metal halide is selected from the group consisting of sodium chloride, calcium chloride, ferric chloride and potassium chloride.

4. The process of claim 1 wherein the soluble metal halide is sodium chloride.

5. The process of claim 2 wherein said recovery of the germanium from the dextran-based material comprises distilling the germanium-containing dextran-based material at temperatures sufficient to selectively separate germanium from the dextran-based material.

6. The process of claim 1 wherein said recovery of the germanium from the dextran-based material comprises distilling the germanium-containing dextran-based material at temperatures sufficient to selectively separate germanium and arsenic from the dextran-based material, and separating the germanium from the arsenic by extraction of the germanium with carbon tetrachloride.

7. The process of claim 1 wherein said recovery of the germanium from the dextran-based material comprises contacting the germanium-containing dextran-based material with a solution of hydrochloric acid and hydrofluoric acid to from a third ion-containing solution, adding calcium chloride to the third ion-containing solution to precipitate calcium fluoride, niobium and zirconium, filtering the solution and distilling the germanium from the solution.

8. The process of claim 4 wherein the soluble metal halide concentration is at least about 25 grams per liter.

9. A process for selective separation of arsenic from proton irradiated molybdenum targets comprising:
    dissolving a proton irradiated molybdenum target in a hydrogen peroxide solution to form a first ion-containing solution;
    contacting the first ion-containing solution with a cationic exchange resin whereby ions selected from the group consisting of molybdenum, technitium, selenium, vanadium, a portion of zirconium, a portion of rubidium, niobium, arsenic and germanium are contained with a second ion-containing solution while ions selected from the group consisting of a portion of rubidium, zinc, beryllium, cobalt, iron, manganese, chromium, strontium, yttrium and a portion of zirconium are selectively absorbed by the cationic exchange resin;
    adjusting the pH of the second ion-containing solution to within the range of from about 0.7 to about 1.5;

adding sufficient soluble metal halide to the second ion-containing solution to adjust concentration of the soluble metal halide in the second ion-containing solution to a level adapted for subsequent separation of arsenic;

contacting the pH-adjusted, soluble metal halide-containing second ion-containing solution with a dextran-based material for sufficient time whereby germanium, niobium, zirconium and arsenic are separated by the dextran-based material;

recovering the germanium and arsenic from the dextran-based material; and, selectively separating the arsenic from the germanium.

10. The process of claim 11 wherein the soluble metal halide is selected from the group consisting of sodium chloride, calcium chloride, ferric chloride and potassium chloride.

11. The process of claim 9 wherein the soluble metal halide is sodium chloride.

12. The process of claim 9 wherein said recovery of the germanium and arsenic from the dextran-based material comprises distilling the germanium- and arsenic-containing dextran-based material at temperatures and conditions adapted to separate germanium and arsenic from the dextran-based material.

13. The process of claim 12 wherein the selective separation of the arsenic from the germanium comprises extracting the germanium into an organic phase whereby the arsenic selectively remains in an original aqueous phase.

14. The process of claim 11 wherein the soluble metal halide concentration is at least about 25 grams per liter.

* * * * *